(12) United States Patent
Price et al.

(10) Patent No.: US 11,615,689 B2
(45) Date of Patent: Mar. 28, 2023

(54) SYSTEM AND METHOD FOR A WARNING DEVICE WITH VALIDATION AND INDEPENDENT OPERATION

(71) Applicants: Michael Price, Palo Alto, CA (US); Gilead Wurman, Union City, CA (US)

(72) Inventors: Michael Price, Palo Alto, CA (US); Gilead Wurman, Union City, CA (US)

(73) Assignee: Pro-teq Systems, Inc., Palo Alto, CA (US)

( * ) Notice: Subject to any disclaimer, the term of this patent is extended or adjusted under 35 U.S.C. 154(b) by 0 days.

(21) Appl. No.: 17/086,655

(22) Filed: Nov. 2, 2020

(65) Prior Publication Data
US 2022/0139191 A1    May 5, 2022

(51) Int. Cl.
| | |
|---|---|
| G08B 21/10 | (2006.01) |
| H04W 4/90 | (2018.01) |
| G08B 31/00 | (2006.01) |
| G01V 1/00 | (2006.01) |

(52) U.S. Cl.
CPC ............ *G08B 21/10* (2013.01); *G01V 1/008* (2013.01); *G08B 31/00* (2013.01); *H04W 4/90* (2018.02)

(58) Field of Classification Search
CPC .... H04B 7/22; H04B 10/25752; H04B 7/028; H04B 17/391; H04B 7/12; H04B 7/24; G08B 21/10; G08B 27/00; G08B 27/006; G01M 5/0033; G01M 5/0041; G01M 5/0066; G01V 1/008; G01V 1/18; G01V 2210/1232; G06Q 40/04; H04L 1/06; H04L 67/02; B60K 28/063; B60W 2540/24; B60W 2556/50; G01C 21/26; G01C 21/3697; G01S 13/956; G01W 1/00; H04W 12/106; H04W 4/021; H04W 4/90

USPC ....... 340/690, 506, 511, 517, 521, 533, 507, 340/3.1, 3.2, 628, 693.3

See application file for complete search history.

(56) References Cited

U.S. PATENT DOCUMENTS

| | | | |
|---|---|---|---|
| 4,921,067 A * | 5/1990 | Fulkerson | E02D 7/08 181/114 |
| 6,518,878 B1 * | 2/2003 | Skoff | G08B 7/06 340/506 |
| 7,714,733 B2 * | 5/2010 | Farley | G08B 27/00 340/628 |
| 9,326,267 B1 * | 4/2016 | Fujisaki | H04W 4/023 |
| 9,799,195 B2 * | 10/2017 | Lu | G08B 21/10 |
| 2010/0173604 A1 * | 7/2010 | Hofmann | G08B 27/008 455/404.1 |
| 2010/0183440 A1 * | 7/2010 | Von Mutius | F03D 7/0264 416/1 |
| 2015/0331120 A1 * | 11/2015 | Hsu | G01V 1/008 702/15 |
| 2017/0301220 A1 * | 10/2017 | Jarrell | G05D 1/0022 |
| 2019/0250621 A1 * | 8/2019 | Ghannam | G08G 1/096741 |
| 2020/0244352 A1 * | 7/2020 | Babich | H04B 10/25752 |
| 2020/0284930 A1 * | 9/2020 | Hida | G01M 5/0041 |

* cited by examiner

*Primary Examiner* — Daniel Previl (57) ABSTRACT

A device and method for receiving real-time warning messages about a hazardous situation, for which an alert or a mitigating control action may be warranted, with the means to measure the effects forecasted by the parameters contained in the warning messages, adjust the parameters to more accurately reflect local conditions, and provide feedback about the performance and accuracy of the system sending the warning messages.

20 Claims, 4 Drawing Sheets

Figure 1

Figure 3 (Amended)

(Chiou and Youngs, 2008)

Figure 4

SYSTEM AND METHOD FOR A WARNING DEVICE WITH VALIDATION AND INDEPENDENT OPERATION

RELATED APPLICATIONS

This application claims the benefit of U.S. Patent Provisional Application No. 62/930,558, filed Nov. 4, 2019, the entire contents of which are hereby expressly incorporated by reference herein in its entirety and for all purposes. In addition, any and all applications for which a foreign or domestic priority claim is identified in the application data sheet as filed with the present application are also expressly incorporated by reference.

FIELD OF THE INVENTION

The present invention relates to a receiver of hazard warnings that provides feedback to the warning system about the effectiveness and accuracy of the warning.

BACKGROUND

A warning system that detects some impending hazard and sends messages to affected sites needs some way to assess the effectiveness and accuracy of the information for each site receiving the warnings. This is needed because each site may experience different impacts from the same hazard. Differences in the amount of time needed to communicate hazard messages can also alter the effectiveness of warning messages.

Operators and users of these systems want to assess the performance of the system. This is often done with after action reports or surveys. These evaluations are often qualitative or based on data covering a small subset of affected locations. Performance measures are important for guiding improvements in the system, allowing users to assess the quality and value of the system, and occasionally, for assessing liability. These assessments are less credible if the performance analysis is incomplete, subjective, or opaque.

The warning system may not be able to communicate with the intended receivers for any of a number of reasons including interruption of communications or outages of the system itself. These system failures leave intended recipients of the warnings with no protection at all.

In some cases, local conditions affect the accuracy of the warning forecasts. This may be because the system evaluates the hazard regionally without looking at local variations. This may lead to false alarms or missed alarms.

There are several problems to be addressed:

1. How can the warning system know whether warning messages arrived in a timely fashion?

It is certainly possible to verify that warning messages were properly received. It is more important to verify that the messages were received in time. To determine this, some method of detecting the onset of the hazard is needed at the location being warned.

2. How does the warning system know whether the intended alerting and initiation of action occurred?

It is important to know whether the response to the warning was appropriate, effective, and timely. If a control action is initiated, validation that the action actually took place is important. It is also important to have some method of evaluating whether the intended alerts or actions were completed in time to mitigate the effects of the hazard.

3. How can the warning system evaluate the accuracy of the forecast it made at each location receiving the warning?

Some method of assessing the accuracy of the warning information is useful for improving the warning system. It is also of interest to users of the warning system who want to know how well it performs. Since the effects of the hazard may vary considerably from one location to another, site-specific assessments are needed.

4. How can hazard warnings take into account local conditions that affect how the hazard is experienced?

A device intended to produce an alert or initiate some action in response to an impending hazard may also need to adjust its response based on local conditions. These conditions can affect the severity of the hazard. The warning receiver should be able adjust the forecasted hazard severity to more accurately reflect local variation, to inform hazard-dependent decisions for alerts and control actions.

5. How can the user not be left unprotected in the event warning messages cannot be received?

A disruption of communications can prevent warning messages from arriving where they are needed. An excessive delay in producing the warning can result in messages arriving after the hazard has impacted the user. A means by which the warning receiver can provide some minimal warning of the hazard is needed.

A solution is needed which: (a) is based on data which are quantitative, rather than qualitative; (b) includes data about all or nearly all of the receivers of the warning; (c) is based on data automatically collected; (d) can be archived with third parties to provide a reliable and auditable record of the performance of the system; (e) can use these data to improve the response to future warnings; and (f) should be able to operate autonomously when the warning system is not operating.

SUMMARY OF THE INVENTION

The present invention provides an automated and quantitative method of assessing the accuracy, effectiveness, and timeliness of warnings delivered to warning receivers. A warning receiver accepts messages from a warning system and uses the information provided in the warning messages to decide whether to initiate local actions, such as producing an alert or controlling equipment. The present invention is a warning receiver equipped with sensors that can measure the specific impacts of the hazard when it arrives. The data from these sensors is used to build a model of how local conditions affect local experience of the hazard. This model is used to adjust the forecasted parameters of the hazard contained in the warning messages to more accurately reflect expected local effects. The adjusted parameters are then used to inform the decision about whether to initiate actions.

The warning receiver sensors also provide data to be used to build a model of how local conditions affect local experience of the hazard. This model is used to adjust the forecasted parameters of the hazard contained in the warning messages to more accurately reflect expected local geophysical impacts. The adjusted parameters are then used to inform the decision about whether to initiate actions.

The warning receiver sensors can also detect impending hazards and provide a local hazard warning independently from the warning system, when messages from the warning system are unavailable or untimely.

DETAILED DESCRIPTION

The invention has advantages and features which will be more readily apparent from the following detailed description of the invention and the appended claims, when taken in conjunction with the accompanying drawings.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as described here.

Definitions

As used herein, the term "warning system" refers to a system that monitors the environment with the intention of providing advance warning information to locations within that environment that may be affected by some hazardous event.

As used herein, the term "warning receiver" refers to a device capable of receiving warning messages and acting upon them.

As used herein, the term "warning message" refers to communication that contains information about a potentially hazardous or hazardous condition. These messages can originate within the warning receiver or, more commonly, originate from some remote location.

As used herein, the term "parameter" refers to a value for some forecasted geophysical impact of the hazard referenced in a warning message. These values are normally numeric, but can contain any arbitrary data.

As used herein, the term "effect" refers to a measurable geophysical impact of the hazard on the environment.

As used herein, the term "sensor" refers to any device or subsystem capable of detecting the effects, whether directly or indirectly, of the onset of the hazardous condition referenced in a warning message.

As used herein, the term "alert" refers to any annunciation, whether audible, visible, or otherwise, intended for people.

As used herein, the term "action" refers to any automated response involving equipment or other physical devices.

As used herein, the terms "decision" and "deciding" are used to refer to any algorithmic, heuristic, or other evaluation of available information leading to a choice of alert or action to be initiated.

As used herein, the terms "PGA", PGV", and "PD" refer to Peak Ground Acceleration, Peak Ground Velocity, and Peak Displacement respectively.

As used herein, the term "P-wave" refers to the Primary wave produced by an earthquake, which are typically the first indication that an earthquake is underway.

As used herein, the term "S-wave" refers to the Secondary waves produced by an earthquake, which typically convey the majority of the energy of an earthquake.

Overview

The present invention discloses a warning receiver that has sensors to verify and evaluate the parameters of a hazardous condition as compared to those received in warning messages. The sensors measure the geophysical impacts of the hazard as they occur, and compare these geophysical impacts to parameters received in warning messages, so as to build a model of how local conditions influence the geophysical impacts of the forecasted hazard. The specific sensors required will depend upon the type of hazard. Geophysical impacts are physical phenomena that affect the natural earth, such as for example: strong ground motions: landslides, lahars, and/or earth-flows: soil liquefaction: and/or ground inundation. The sensors used to measure the geophysical impacts of a hazardous condition as compared to parameters received in warning messages can also be used to provide an assessment of the accuracy and performance of the warning system, or to operate independently from the warning system in the event that receipt of warning messages is interrupted, or both of these.

In the preferred embodiment, the receiver comprises, among other components, motion sensors, measuring one or more of acceleration, velocity, or displacement, to validate forecasts of ground motions.

In the preferred embodiment, the receiver uses the component sensors to measure effects corresponding to the parameters contained in the warning message for the purpose of validating the accuracy of those parameters.

In the preferred embodiment, this modeling is used to provide an independent forecast of the hazard so the receiver can respond independently from the warning system.

In the preferred embodiment, the receiver uses the component sensors to monitor the hazard parameters for the purpose of providing a warning message independently from the warning system when receipt of warning messages is interrupted or untimely. This allows a warning to be provided even when warning messages from the warning system are unavailable.

Overview

The preferred embodiment is a device capable of receiving real-time information about potentially hazardous situations. The device has the ability to determine how its local situation affects the parameters provided about the hazard, so as to modify its decisions about what alerts and actions to initiate. It is capable of measuring the effects of the hazard when they eventually occur, so as to compare them with the effects as predicted in the warning message. It is capable of operating in a manner independent of the warning system when warning messages are not available.

The warning receiver uses its component sensors to extract the parameters contained in the warning message for the purpose of modeling how local conditions affect the forecasted warning parameters. In one embodiment, this modeling is used to adjust responses to warning messages. In one embodiment, this modeling is used to provide an independent forecast of the hazard so the receiver can provide a warning without the benefit of warning messages from the warning system.

A warning receiver generally comprises a receiver, to receive warning information, and some method for initiating a response, such as an audible alert. The preferred embodiment of this invention additionally comprises one or more sensors capable of collecting data singly or in combination that can be used to assess the accuracy of the information in warning messages and to permit some level of independent operation in cases where warning messages to the receiver are interrupted.

The present invention applies to warnings in general. An earthquake warning embodiment is described to explain the invention in detail. Other embodiments will be apparent to those skilled in the art. It is intended that the scope of the present invention herein disclosed should not be limited by the particular disclosed embodiment described below.

In the following paragraphs, the sensor is assumed to be an accelerometer. Someone skilled in the art will immediately understand how the following can be accomplished using some other motion sensor, such as one measuring velocity or displacement.

The Warning System

Figure 1:
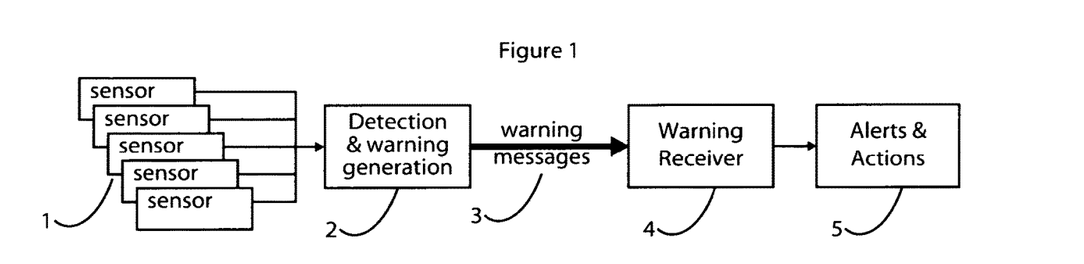
FIG. 1 is a block diagram of a warning system showing the warning source and the warning receiver.

At the most basic level, a warning system of FIG. 1 comprises sensors (1) for detecting hazardous situations, a means for analyzing the sensor data (2) to detect a hazard, a means for distributing messages to locations that will be affected by the hazard (3), and one or more warning receivers (4) capable of producing alerts and initiating actions in response to the warning messages (5). Each warning message contains information about the impending hazard needed by the warning receivers to determine whether to initiate appropriate alerts and actions.

In one embodiment, the warning system sensors (1) are distributed regionally to maximize the warning systems ability to rapidly detect and analyze the hazard.

In one embodiment, the warning system is remote from the locations affected by the hazard and warning messages are sent to the warning receivers via some communication channel such as the Internet, radio link, satellite link, cellular link, or other means for sending and receiving digital data in near real time.

In another embodiment, the warning system is integrated into the warning receiver itself and communication occurs over a local link such as a bus, local area network, a hardware interconnect such as I2C or SPI, or via an inter-process call.

For some hazards, such as an earthquake, the amount of warning time may be small, due to the rapid onset and propagation of the hazards effects. For these hazards, detection and analysis must occur rapidly and warning messages must be sent to the warning receivers in a manner that reduces communications latency as much as possible.

Communications between the warning system and the warning receivers must be secure to prevent malicious interference.

The present invention extends this model of a warning system by adding a reverse communication path from the warning receivers back to the warning system, so as to assess the warning system's performance and improve its accuracy.

The Earthquake Warning Receiver

Figure 2:
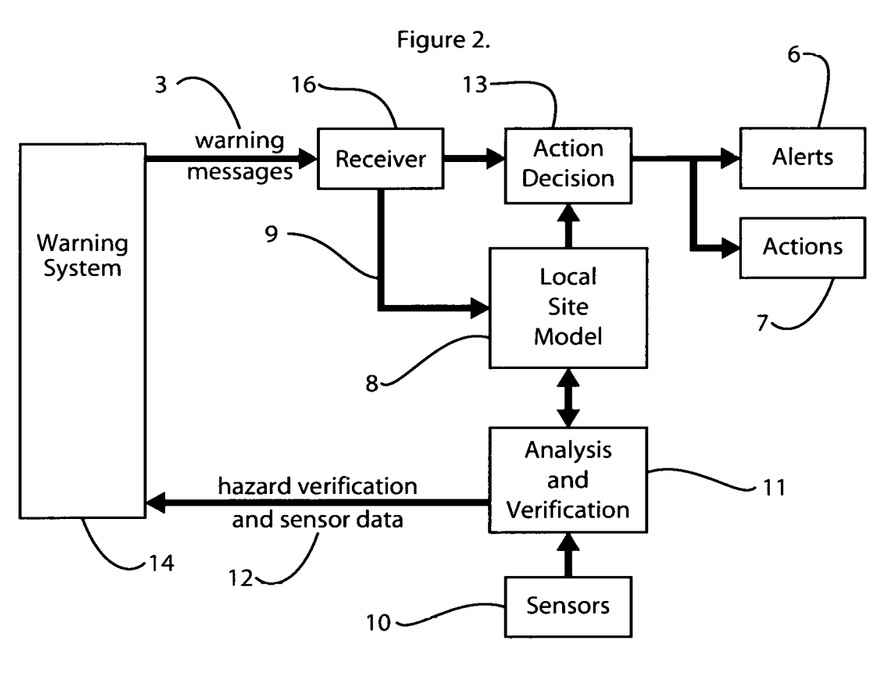
FIG. 2 is a block diagram of the warning receiver showing the major sub-components. Other partitioning of the functions is possible.

Earthquake warning receivers of FIG. 2 are sent warning messages (3) from the warning system (14) containing parameters describing the earthquake and its likely effects at the receiver's location. Among the earthquake parameters provided may be magnitude, expected peak shaking intensity, likely time of arrival of severe shaking, likely time of arrival of peak shaking, spectral acceleration estimates, estimated duration of shaking, and source location. Multiple warning messages may be sent during the course of the earthquake to provide updated information to the warning receivers.

The parameters are passed via a receiver (16) to a subsystem (13) tasked with deciding whether an action is warranted and which actions are appropriate. The results are passed to the appropriate alerting (6) or controlling (7) functions.

The parameter values present in the warning message may be adjusted based on a local site model (8). The local site model describes how local conditions affect local effects of the hazard. In the preferred embodiment, the local site model includes site amplification parameters. The site amplification model is used to adjust the forecasted peak ground acceleration (PGA) based on the local $V_{S30}$ value (a measure of the local shear wave velocity in the upper 30 meters of soil). Other site-specific parameters that affect how the site responds to the hazard will be apparent to those skilled in the art.

Figure 3:
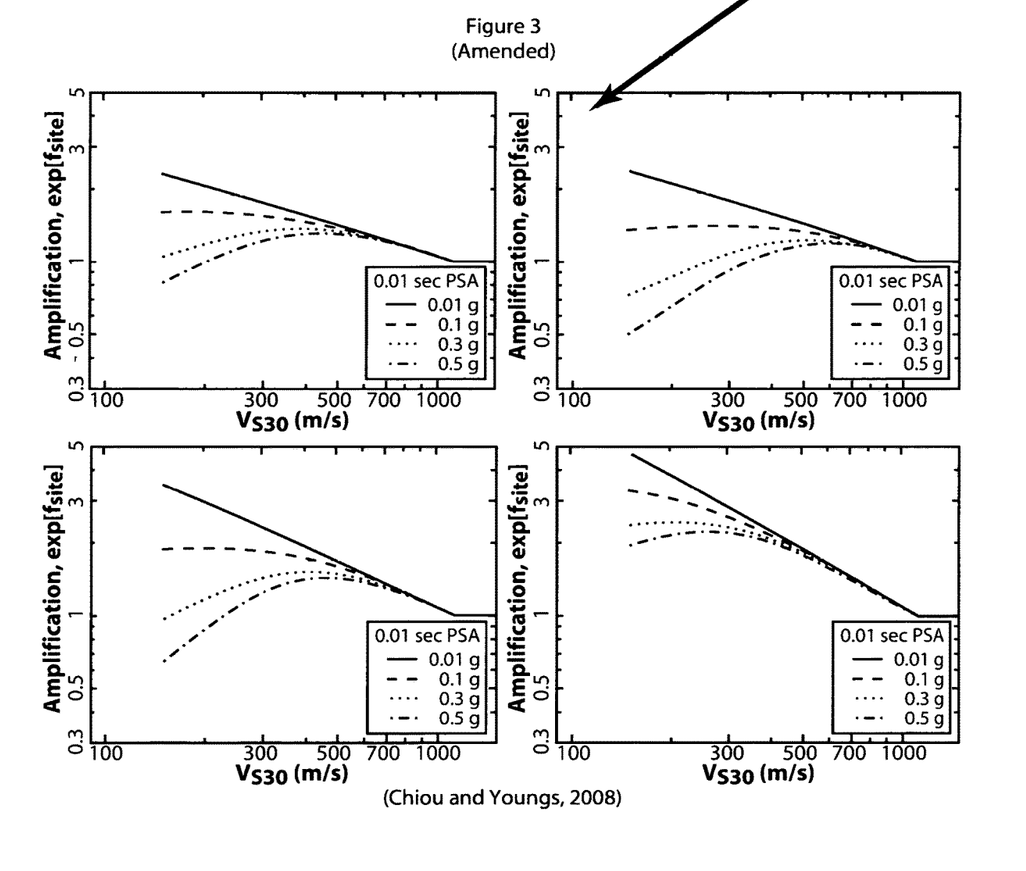
FIG. 3 is a block diagram of the warning performance assessment subsystem.

An example of how local soil conditions affect the expected ground motions is shown in FIG. 3. The four graphs show amplification factors as a function of $V_{S30}$ for four values of pseudo spectral acceleration (PSA) at four spectral periods. They show that local soil conditions can either increase or decrease expected accelerations relative to those experienced for reference soil conditions, and that this increase or decrease is dependent on $V_{S30}$, as well as the amplitude and period of the input accelerations. The increase or decrease can be by a factor of two, three, four, or greater in certain conditions. Thus, the ability to take these conditions into account leads to a more accurate estimate of the expected ground motions, and is important for making appropriate decisions about actions to be taken.

Data for the local site model can be provided from outside sources such as site surveys, but these are often unavailable and can be expensive to conduct. Turning again to FIG. 2, the present invention addresses this issue by using local sensors (10) to measure local effects during earthquakes of various magnitudes, and by monitoring ambient seismic noise at the site. The data collected can be used to produce a site amplification model. There are several applicable techniques known to those skilled in the art.

In the preferred embodiment there is at least one sensor capable of measuring ground acceleration. Sensors of ground velocity or displacement may also be used. The data from the sensor or sensors is processed in the analysis subsystem (11). The results of sensor analysis and, in some cases, the raw sensor data (12) are sent back to the warning system (14). In the preferred embodiment, these data are sent back using the same communications means that was used to send the messages (3) to the warning receiver. In other embodiments, a separate communication means may be used.

Warning messages are time-sensitive. In an earthquake, there are just a few seconds between when the warning system detects the earthquake and strong shaking occurs at affected sites. The communications between the warning system and the warning receivers may be optimized for latency. The reverse path is not so time sensitive. Data provided by the warning receiver for the purpose of assessing the performance of the warning system be transmitted after the hazard has passed.

In the preferred embodiment, the same communications channel is used to be able to provide timely assessments of the system's performance. The channel used for sending warning messages is expected to achieve low latency and high levels of security and reliability. This makes real time assessments of warning system performance possible. In one embodiment, the data from the warning receivers is used to augment the warning system's hazard analysis. Records of the experience of each of the warning receiver sites can be archived as they are received so that users can review those reports after the earthquake hazard has passed.

Figure 4:
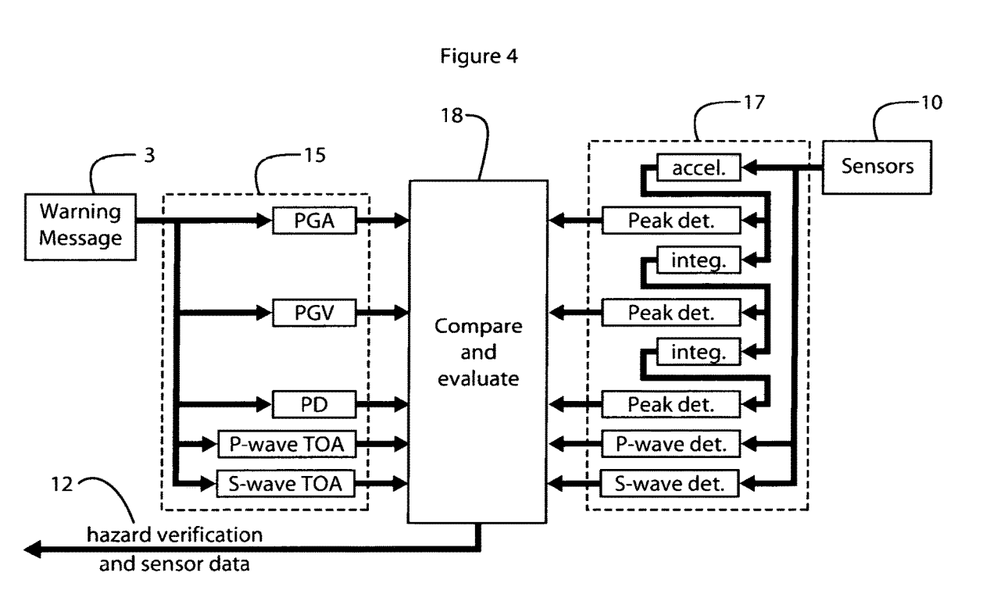
FIG. 4 contains plots of ground motions as a function of acceleration and local soil conditions ($V_{S30}$) showing site amplification effects.

The analysis subsystem is shown in more detail in FIG. 4.

The warning messages (3) comprise parameters (15) describing the expected effects of the hazard. In the preferred embodiment, these parameters may include one or more of peak ground acceleration; peak ground velocity; peak displacement; time-of-arrival of the P-wave; or time-of-arrival of the S-wave. Other relevant parameters may include: location of the source; estimated magnitude; duration of shaking above some threshold; or time of peak shaking. These parameters may be scalars or can be provided as spectral vectors, such as for example, peak ground acceleration as a function of frequency.

The progress of the earthquake is monitored by the sensors (10) and parameters are extracted from the sensor data by the analysis and verification subsystem (11). The measured and extracted parameters of the earthquake can be compared (18) with those provided in the warning message. Parameters are extracted from the incoming warning messages (3) and recorded for comparison. The data from the sensors (10) are evaluated to make observations (17) that can be compared (18) to the forecasted parameter values (15) provided in the warning message. These comparisons are saved for later evaluation. After the hazard has passed, the comparisons are used to assess the accuracy and timeliness of the warning messages.

In Normal Operation

The receiver constantly monitors its component sensors to collect data used for modeling local conditions and calibrating sensor performance. These analyses may require the collection of data over long periods of time. Analysis of the data is used to create a model for the sensors and properties of the local environment that may affect how the receiver responds to a warning message. These properties may include $V_{S30}$, structural effects, sensor alignment, and others. Exogenous information, such as $V_{S30}$ maps, may also be provided to augment sensor data. The warning receiver may also use model data based on analyses performed elsewhere.

In the preferred embodiment analysis of the sensor data collected by the warning receivers is passed back to the warning system for analysis. This allows the warning system to compare data from warning receivers in close proximity to more effectively model local conditions. The data are also analyzed within the warning receivers.

Operation Upon Receipt of a Warning Message

The parameters provided in the warning message are adjusted, as appropriate, with the models developed in the course of normal operation. The local decision process uses the adjusted parameters to determine which alerts and actions are to be taken. The sensors are monitored to collect data needed to verify the forecasts present in the warning message and those produced by the models. These data may include: arrival time and characteristics of the P-wave and S-wave, the PGA or PGV eventually experienced, the duration of ground motions above some threshold, and measurements of spectral content.

The warning system may update its hazard parameters by sending additional warning messages. The warning receiver keeps a record of all such messages and the parameters received in them. This provides a means to assess the warning system's evolving forecasts of the hazard.

Operation after an Event

Validating estimated time-of-arrival (TOA) is done by recording the arrival time of the warning message and comparing with the arrival time of the observation of interest. Some observations of interest include P-wave onset, S-wave onset, time of peak acceleration, and time of peak velocity.

P-wave detection can be accomplished with a number of techniques including the ratio of the short-term average and long-term average of the sensor data. These are familiar to someone skilled in the art.

S-wave detection can be accomplished by monitoring the 3D acceleration vector and looking for the onset of transverse motions. This is also familiar to someone skilled in the art.

The warning system gathers the evaluations of the individual warning receivers to determine the accuracy of the parameters distributed in warning messages prior to the event. This information is used to adjust algorithms used to determine the parameters and to adjust models used for assessing regional effects. These data can also be used to report the performance of the warning system to the owners of each of the receiver devices.

Operation of Receivers Independent From the Warning System

When warning messages cannot be received from the warning system, the receiver device may be able to operate independently from the warning system, providing warning for a hazard. In the case of an earthquake warning receiver, the component ground motion sensors can also be used as a data source for producing warnings independently. This is done by detecting the P-wave, analyzing its characteristics in order to estimate the intensity of the following ground motions, and providing a warning that includes many of the same parameters that appear in a warning message from the warning system.

Local analysis of ground motions cannot provide as much information about an earthquake as a warning system. It can, however, provide a useful amount of warning time and accurate intensity estimates in many cases. Algorithms for analyzing P-waves are well known and apparent to someone skilled in the art.

Performance and accuracy using independent local analysis by the warning receiver will suffer compared with that available from the warning system, but it can provide some backup protection when the warning messages cannot be received or they arrive too late.

One concern about operating independently from the warning system is the amount of warning time that can be provided. A P-wave detection system can provide about 1 second of warning for every 5 miles of distance from the epicenter of the earthquake. This is due to the relative speeds of the P-wave and S-wave. A warning system can provide 1 second of warning for every 2.2 miles distance to the epicenter. This is because the warning system's sensors may be closer to the epicenter that the warning receiver's component sensors, so there is less delay in P-wave analysis.

Warning time will be reduced by the time required to analyze P-wave data, whether from a warning system or independent operation. Warning time is particularly important near the epicenter.

In cases where the warning can not be provided before the arrival of the S-wave, the ground motion sensors can be used to implement a seismic switch function. A seismic switch triggers an action when ground motions exceed specific thresholds, as set by the user. A seismic switch operates after the S-wave arrives, but it may initiate predetermined actions intended. Seismic switches are used to turn off gas valves, for example. Using the warning receiver's component sensors in this manner provides a backup for when warning messages arrive after the S-wave.

The present invention makes it possible to receive warnings from a remote warning system, and provide an independent, site-specific evaluation of the performance and accuracy of the warning system's messages. It also provides a means for improving the accuracy of the hazard forecasts contained in the warning messages by measuring local responses to hazards and using this information to adjust its response warning messages. It also uses the receivers to provide quantitative and automatic feedback to the warning system so that its performance can be improved over time.

The invention claimed is:

1. A warning receiver apparatus, comprising:
one or more processors; and
one or more memories storing instructions that, when executed by the one or more processors, cause the one or more processors to perform operations comprising:
receiving sensor data that measures one or more local geophysical impacts of a first hazard described in a first warning message;
generating a model of a local environment based on one or more comparisons of the sensor data to a first set of parameters in the first warning message; and
generating a forecast of a second hazard associated with the local environment based on the model, wherein the forecast includes a second set of parameters.

2. The warning receiver apparatus of claim 1, further comprising one or more sensors that collect the sensor data from the local environment.

3. The warning receiver apparatus of claim 1, wherein the instructions further cause the one or more processors to perform operations comprising receiving the first warning message via a wired communications link or a wireless communications link.

4. The warning receiver apparatus of claim 1, wherein first hazard described in the first warning message comprises an earthquake.

5. The warning receiver apparatus of claim 1, wherein the sensor data comprises at least one of an acceleration, a velocity, or a displacement.

6. The warning receiver apparatus of claim 1, wherein generating the model of the local environment comprises:
analyzing the sensor data to determine a third set of parameters, wherein the third set of parameters comprises at least one of: a time of onset of ground motions, a peak ground acceleration, a peak ground velocity, a peak ground displacement, a P-wave arrival, or an S-wave arrival; and
generating the one or more comparisons of the third set of parameters with the first set of parameters in the first warning message.

7. The warning receiver apparatus of claim 1, wherein generating the model of the local environment comprises analyzing the sensor data to produce metrics used to model local soil conditions.

8. The warning receiver apparatus of claim 1, wherein generating the forecast of the second hazard comprises:
analyzing additional sensor data based on the model of the local environment to estimate an intensity of ground motions associated with the local environment; and
generating the forecast of an earthquake corresponding to the second hazard based on the estimated intensity of ground motions.

9. The warning receiver apparatus of claim 1, wherein generating the forecast of the second hazard comprises:
receiving a second warning message that includes a third set of parameters representing the one or more local geophysical impacts of the second hazard; and
adjusting the third set of parameters based on the model to produce the second set of parameters.

10. The warning receiver apparatus of claim 1, wherein the instructions further cause the one or more processors to perform operations comprising initiating one or more actions based on the second set of parameters in the forecast of the second hazard.

11. The warning receiver apparatus of claim 1, wherein the instructions further cause the one or more processors to perform operations comprising transmitting the second set of parameters to a source of the first warning message.

12. A warning system, comprising:
one or more processors; and
one or more memories storing instructions that, when executed by the one or more processors, cause the one or more processors to perform operations comprising:
distributing one or more warning messages describing a first hazard to one or more remote warning receiver apparatuses, wherein the one or more warning messages include a first set of parameters representing one or more geophysical impacts of the first hazard;
receiving adjustments to the first set of parameters from a first warning receiver apparatus in the one or more remote warning receiver apparatuses, wherein the adjustments to the first set of parameters reflect a local experience of the first hazard at the first warning receiver apparatus;
determining a second set of parameters representing the one or more geophysical impacts of a second hazard based on the adjustments to the first set of parameters; and
transmitting an additional warning message that describes the second hazard and includes the second set of parameters to the first warning receiver apparatus.

13. The warning system of claim 12, wherein the adjustments to the first set of parameters comprise measurements of the one or more geophysical impacts of the first hazard by one or more sensors on the first warning receiver apparatus.

14. The warning system of claim 12, wherein determining the second set of parameters comprises:
updating a model of regional effects associated with hazards based on the adjustments to the first set of parameters; and
generating a forecast of the one or more geophysical impacts of the second hazard based on the model, wherein the forecast includes the second set of parameters.

15. The warning system of claim 12, wherein the first hazard described in the one or more warning messages comprises an earthquake.

16. A method, comprising:
receiving sensor data that measures one or more local geophysical impacts of a first hazard on a local environment;
generating a model of the local environment based on one or more comparisons of the sensor data to a first set of parameters in a first warning message describing the first hazard; and
generating a forecast of a second hazard associated with the local environment based on the model, wherein the forecast includes a second set of parameters.

17. The method of claim 16, further comprising transmitting the second set of parameters to a source of the first warning message.

18. The method of claim 16, wherein generating the forecast of the second hazard comprises:
   receiving a second warning message that includes a third set of parameters representing the one or more local geophysical impacts of the second hazard; and
   adjusting the third set of parameters based on the model to produce the second set of parameters.

19. The method of claim 16, wherein generating the forecast of the second hazard comprises:
   analyzing additional sensor data based on the model of the local environment to estimate the second set of parameters corresponding to the one or more local geophysical impacts of the second hazard on the local environment; and
   generating the forecast of the second hazard based on the estimated second set of parameters.

20. The method of claim 16, wherein the model comprises a site amplification model that is used to adjust a forecasted acceleration or a forecasted velocity in the second set of parameters based on a local shear wave velocity.

\* \* \* \* \*